United States Patent
Zhao et al.

(10) Patent No.: US 11,942,792 B2
(45) Date of Patent: Mar. 26, 2024

(54) APPARATUS AND METHODS FOR INVERTER MODE SWITCHING IN WIRELESS CHARGING TRANSMITTERS

(71) Applicant: STMicroelectronics Asia Pacific Pte Ltd., Singapore (SG)

(72) Inventors: Wenhe Zhao, Singapore (SG); Robin Tanzania, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 228 days.

(21) Appl. No.: 17/107,161

(22) Filed: Nov. 30, 2020

(65) Prior Publication Data
US 2022/0173617 A1    Jun. 2, 2022

(51) Int. Cl.
*H02J 50/12* (2016.01)
*H02J 7/02* (2016.01)
*H02M 7/217* (2006.01)
*H02M 7/5387* (2007.01)

(52) U.S. Cl.
CPC .............. *H02J 50/12* (2016.02); *H02J 7/02* (2013.01); *H02M 7/217* (2013.01); *H02M 7/5387* (2013.01)

(58) Field of Classification Search
None
See application file for complete search history.

(56) References Cited

U.S. PATENT DOCUMENTS

| 11,038,374 B2 * | 6/2021 | Prabhala | H02J 7/007192 |
| 11,146,117 B2 * | 10/2021 | Song | H02M 7/48 |
| 2017/0104370 A1 | 4/2017 | Watanabe et al. | |
| 2020/0127495 A1 | 4/2020 | Matsuda | |

FOREIGN PATENT DOCUMENTS

| EP | 2950423 A1 | 12/2015 |
| KR | 102093469 B1 * | 11/2018 |

* cited by examiner

*Primary Examiner* — Daniel Kessie
*Assistant Examiner* — Terrence R Willoughby
(74) *Attorney, Agent, or Firm* — Slater Matsil, LLP

(57) ABSTRACT

A method for operating a wireless charging transmitter includes switching, by the wireless charging transmitter, an operating mode of a full bridge inverter of the wireless charging transmitter from a first mode to a second mode; and changing, by the wireless charging transmitter, an operating point of the wireless charging transmitter from a first operating point associated with the first mode to a second operating point associated with the second mode, the second operating point being selected to dampen a change in a rectifier voltage of a wireless charging receiver inductively coupled to the wireless charging transmitter.

20 Claims, 11 Drawing Sheets

APPARATUS AND METHODS FOR INVERTER MODE SWITCHING IN WIRELESS CHARGING TRANSMITTERS

TECHNICAL FIELD

The present invention relates generally to methods and apparatus for inverter mode switching in wireless charging transmitters.

BACKGROUND

Powering electronic devices has been a challenge for system designers. Early electronic devices were tethered to an electrical power source by a power cord. Batteries provided freedom to move around, but the batteries still required replacement or recharging. Recharging the batteries required the batteries or the electronic devices be plugged into an electrical power source using a power cord.

Wireless charging systems eliminate the power cord by transferring power in free space, where the power can be used to charge the rechargeable batteries or directly power the electronic device. Wireless charging systems eliminate difficulties associated with plugging the power cord to the electronic device, such as fumbling with the orientation of the plug, ensuring that the correct power cord is being used, wearing out of physical connectors and connections, and so on. Therefore, wireless charging systems are attractive to end-users.

The Qi standard by the Wireless Power Consortium (WPC) is currently the protocol used in the majority of wireless charging systems. Qi wireless charging systems are based on magnetic induction between a wireless charging transmitter (TX) and a wireless charging receiver (RX). A wireless charging TX typically uses an inverter to covert direct current (DC) to alternating current (AC). When the inverter used in the wireless charging TX is a full bridge inverter, it is often possible to operate in either a full bridge inverter mode or a half bridge inverter mode.

SUMMARY

In accordance with an embodiment, a method for operating a wireless charging transmitter is provided. The method comprising: switching, by the wireless charging transmitter, an operating mode of a full bridge inverter of the wireless charging transmitter from a first mode to a second mode; and changing, by the wireless charging transmitter, an operating point of the wireless charging transmitter from a first operating point associated with the first mode to a second operating point associated with the second mode, the second operating point being selected to dampen a change in a rectifier voltage of a wireless charging receiver inductively coupled to the wireless charging transmitter.

In accordance with an embodiment, a method for operating a wireless charging transmitter is provided. The method comprising: setting, by the wireless charging transmitter, a full bridge inverter of the wireless charging transmitter to a half bridge inverter mode; increasing, by the wireless charging transmitter, a load of a wireless charging receiver paired to the wireless charging transmitter until a power transfer of the wireless charging transmitter meets a specified threshold; and saving, by the wireless charging transmitter, an operating point of the wireless charging transmitter as a first operating point associated with a half bridge inverter mode, and a rectifier voltage of the wireless charging receiver as a target rectifier voltage, the first operating point dampens a first change in a rectifier voltage of the wireless charging receiver.

In accordance with an embodiment, a wireless charging transmitter is provided. The wireless charging transmitter including: a non-transitory memory storage comprising instructions; and one or more processors in communication with the memory storage, wherein the one or more processors execute the instructions to cause the wireless charging transmitter to: switch an operating mode of a full bridge inverter of the wireless charging transmitter from a first mode to a second mode; and change an operating point of the wireless charging transmitter from a first operating point associated with the first mode to a second operating point associated with the second mode, the second operating point being selected to dampen a change in a rectifier voltage of a wireless charging receiver inductively coupled to the wireless charging transmitter.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

In the ensuing description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
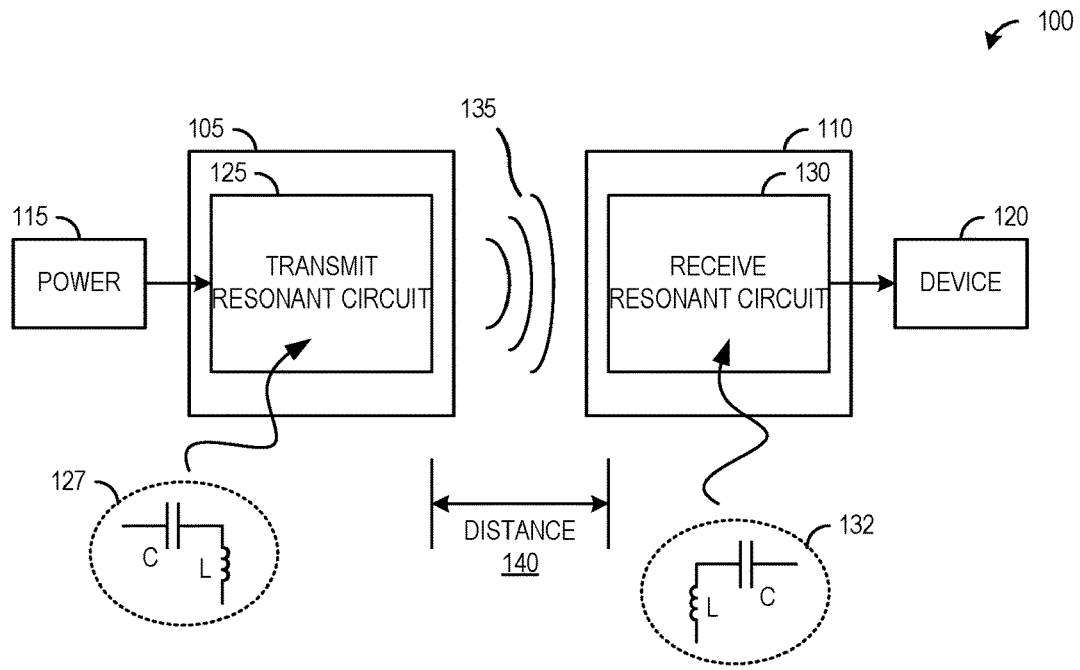
FIG. 1 illustrates a wireless charging system.

FIG. 1 illustrates a wireless charging system 100. Wireless charging system 100 may be adherent to the Qi standard by the Wireless Power Consortium (WPC). Details of the communication can be found in the Qi standard defined by the WPC.

Wireless charging system 100 includes a wireless charging transmitter 105 and a wireless charging receiver 110. Wireless charging transmitter 105, coupled to a power source 115, provides energy to wireless charging receiver 110, which, in turn, provides power to a device 120 coupled to wireless charging receiver 110. The power provided to device 120 may be used to charge rechargeable batteries in device 120 or to directly power device 120 or both. The process of providing energy is referred to as a power transfer.

Wireless charging transmitter 105 includes a transmit resonant circuit 125. A resonant circuit may be characterized by an inductance (L) and a capacitance (C) of the resonant circuit (shown in highlighted regions 127 and 132 for wireless charging transmitter 105 and wireless charging receiver 110, respectively), and the power transferred between wireless charging transmitter 105 and wireless charging receiver 110 is a function of both the inductance and the capacitance of the resonant circuits of the wireless charging transmitter 105 and the wireless charging receiver 110. The purpose of the capacitance (C) is to enhance the efficiency of the power transfer and inductance L is used to transfer the power (transmit coil converts electric current into magnetic flux and receive coil converts magnetic flux into electromotive force). Transmit resonance circuit 125 transmits an energized wireless field (shown as lines 135) using the transmit coil. The energized wireless field (lines 135) is received by a receive resonant circuit 130 of wireless charging receiver 110.

In addition to transmitting and receiving energized wireless fields, a changing of parameters of receive resonant circuit 130 may be used to communicate from wireless charging receiver 110 to wireless charging transmitter 105, and vice versa. For example, in communications between wireless charging receiver 110 to wireless charging transmitter 105, the information being communicated may be used to modulate the amplitude of the wireless fields, thereby enabling the transmission or reception of the information. For example, in communications between wireless charging transmitter 105 to wireless charging receiver 110, the information being communicated may be used to modulate the frequency of the wireless fields, thereby enabling the transmission or reception of the information. As an example, wireless charging transmitter 105 and wireless charging receiver 110 communicate to initiate a wireless charging session, set a charging mode, control the amount of energy transmitted by wireless charging transmitter 105, control the amount of energy received by wireless charging receiver 110, terminate a wireless charging session, and so on. The communication performed is mainly in the uplink direction, e.g., from wireless charging receiver 110 to wireless charging transmitter 105.

Figure 2:
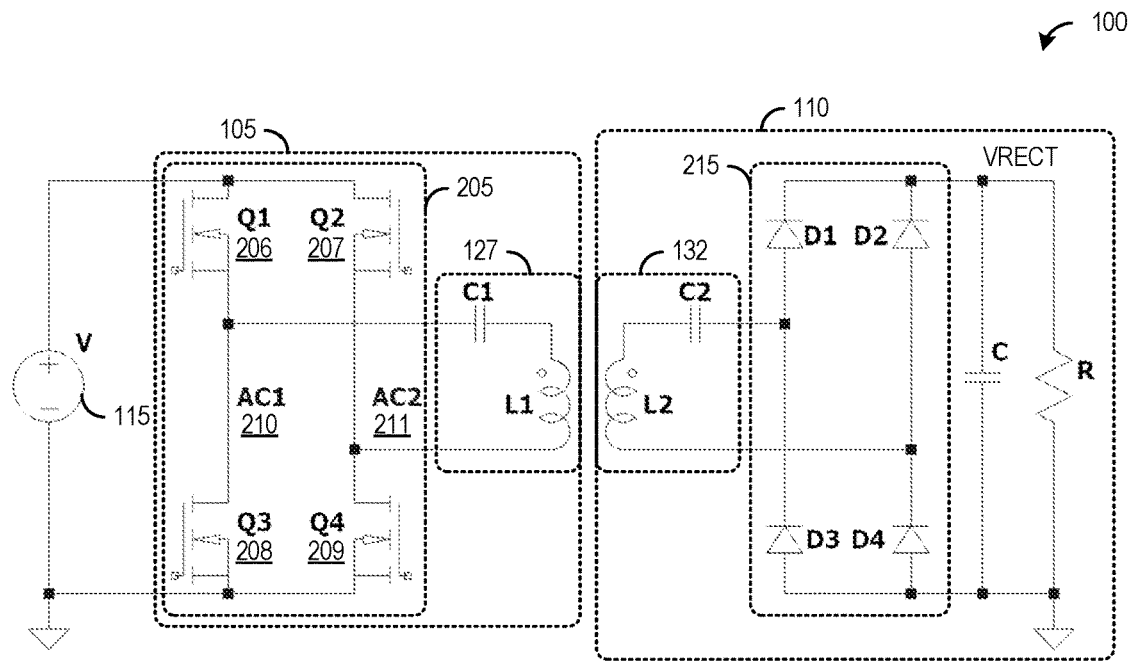
FIG. 2 illustrates a detailed view of the wireless charging system of FIG. 1 in accordance with example embodiments presented herein.

FIG. 2 illustrates a detailed view of wireless charging system 100. Wireless charging system 100 includes wireless charging TX 105 and wireless charging RX 110. When operating, wireless charging TX 105 provides power to wireless charging RX 110 to charge a device coupled to wireless charging RX 110.

Wireless charging TX 105 includes resonant circuit 127 and an inverter 205. As shown in FIG. 2, inverter 205 is implemented as a full bridge inverter. Inverter 205 converts the DC provided by power 115 into AC. Because inverter 205 is a full bridge inverter, inverter 205 may also be configured to operate as a half bridge inverter. Inverter 205 includes transistors 206-209. Controlling the state of transistors 206-209, inverter 205 may be made to operate as a full bridge inverter or a half bridge inverter.

As an example, in order to configure inverter 205 to operate as a full bridge inverter, transistors 206 and 209 and transistors 207 and 208 are alternatively switched on and off. In other words, initially, transistors 206 and 209 are switched on and transistors 207 and 208 are switched off. Hence, AC1 210 is high and AC2 211 is low. Then, transistors 206 and 209 are switched off and transistors 207 and 208 are switched on. Hence AC1 210 is low and AC2 211 is high. The relationship between the durations that transistors 206 and 209 are on and off (and the durations that transistors 207 and 208 are off and on) determines the duty cycle and phase shift.

As another example, in order to configure inverter 205 to operate as a half bridge inverter, transistors 206 and 208 are alternatively switched on and off while transistor 207 is kept off and transistor 209 is kept on. Alternatively, inverter 205 may be configured to operate as a half bridge inverter by keeping transistor 206 off and transistor 208 on while transistors 207 and 209 are alternatively switched on and off. The relationship between the durations that transistors 206 and 208 (and similarly transistors 207 and 209) are on and off determines the duty cycle.

As an example, switching the mode (either full bridge inverter mode or half bridge inverter mode) may be beneficial by reducing or eliminating a requirement for a variable voltage control circuit in wireless charging TX 105, which may help to reduce the cost and complexity of wireless charging TX 105. Wireless charging TX 105 may switch inverter 205 from full bridge inverter mode to half bridge inverter mode when wireless charging RX 110 requires less power, while wireless charging TX 105 may switch inverter 205 from half bridge inverter mode to full bridge inverter mode when wireless charging RX 110 requires more power.

Wireless charging RX 110 includes resonant circuit 132 and a rectifier 215. Wireless charging TX 105 converts DC provided by power source 115 into AC using inverter 205. Resonant circuits 127 and 132, coupled together, form an air core transformer. Wireless charging RX 110 receives the AC power and coverts the AC power back into DC using rectifier 215. The DC voltage is supplied to charge a battery or power a device. Because the battery typically requires a specific voltage to charge, a rectifier voltage (VRECT) of wireless charging RX 110 needs to be within a specific range. If the rectifier voltage (VRECT) goes outside of the specific range, the battery may be overcharged (leading to a dangerous condition) or undercharge (which can significantly slow battery charging).

Based on the level of the received power, wireless charging RX 110 communicates with wireless charging TX 105 to request an increase or decrease in the power provided by wireless charging TX 105. In the Qi standard, wireless charging RX 110 may communicate with wireless charging TX 105 using a control error packet. After receiving the control error packet, wireless charging TX 105 adjusts the power by controlling one or more of the following:

AC frequency;
AC duty cycle or AC phase shift;
Input voltage (as provided by power supply 115).

The above values, which can be varied to adjust the power received by wireless charging RX 110, may be referred to as the operating point of the wireless charging TX 105.

In general, the power provided by a full bridge inverter is approximately twice that of the power provided by a half bridge inverter. This is also true of a full bridge inverter operating in half bridge inverter mode. So, the power provided to wireless charging RX 110 by wireless charging TX 105 when inverter 205 switches from half bridge inverter mode to full bridge inverter mode is approximately two times greater. Similarly, the power provided to wireless charging RX 110 by wireless charging TX 105 when inverter 205 switches from full bridge inverter mode to half bridge operating mode is approximately one-half less. As discussed previously, the dramatic change (which occurs rapidly, on the order of micro-seconds) can be undesirable and potentially dangerous (e.g., damaging to the device or battery being charged).

Figure 3A:
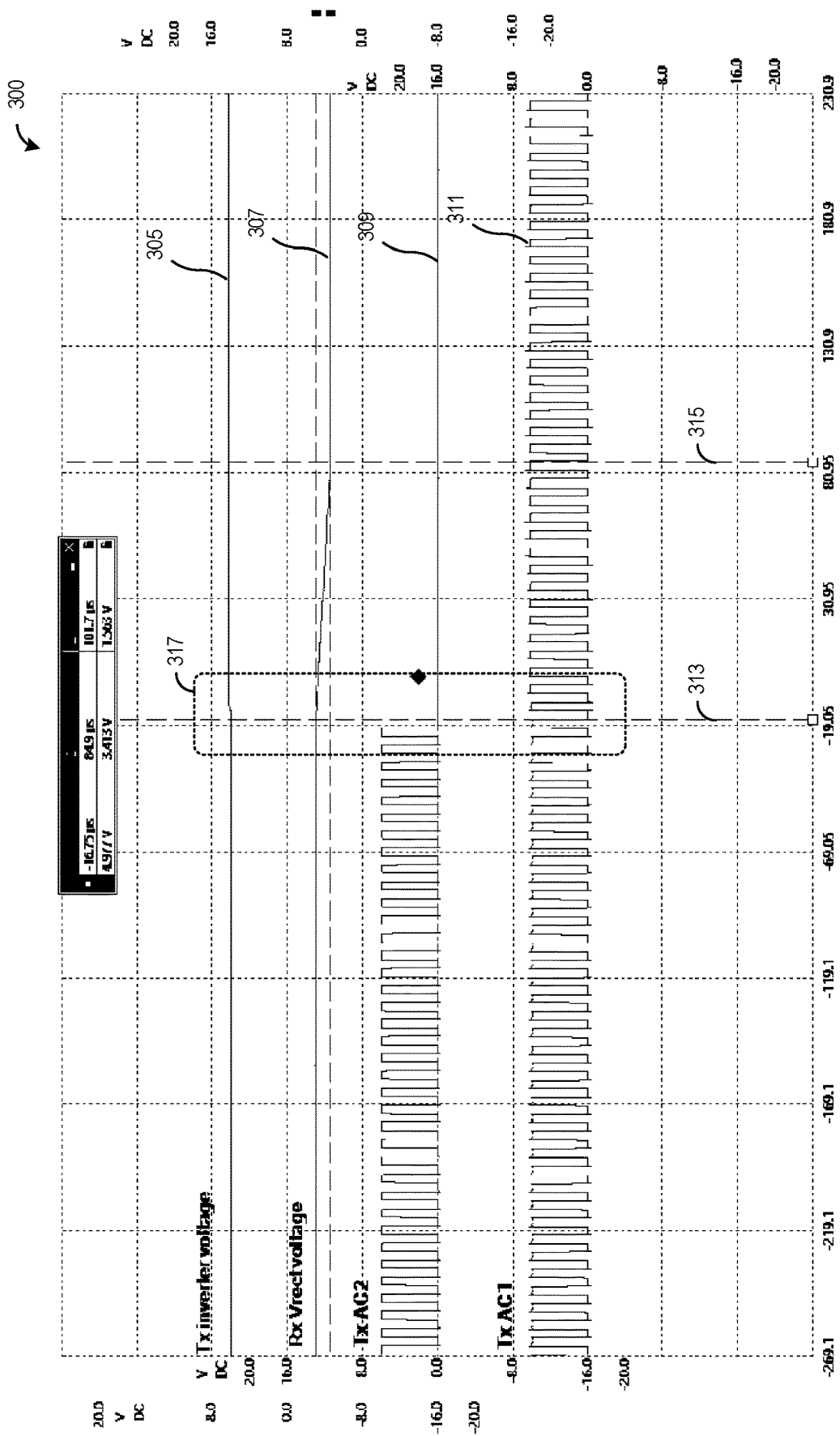
FIG. 3A illustrates a diagram of voltages in the wireless charging system as an inverter switches from full bridge inverter mode to half bridge inverter mode in accordance with example embodiments presented herein.

FIG. 3A illustrates a diagram 300 of voltages in wireless charging system 100 as inverter 205 switches from full bridge inverter mode to half bridge inverter mode. A first trace 305 represents the voltage of inverter 205 of wireless charging TX 105, a second trace 307 represents the voltage VRECT of rectifier 215 of wireless charging RX no, a third trace 309 represents voltage AC2 of inverter 205, and a fourth trace 311 represents voltage AC1 of inverter 205.

At time 313, inverter 205 switches from full bridge inverter mode to half bridge operating mode. In full bridge inverter mode, both voltage AC2 and voltage AC1 are alternating between high and ground. After the switch, voltage AC2 is tied to electrical ground and no longer alternates, and the voltage of rectifier 215 drops quickly from approximately 4.98 volts to approximately 3.41 volts within about 100 micro-seconds, which is much faster than typical Qi standard operation. The low voltage of rectifier 215 may cause a low voltage reset of wireless charging RX 110. Interval 317 encompasses the switch in inverter mode. In a different configuration of inverter 205, voltage AC2 may be tied high. In a different configuration of inverter 205, voltage AC1 may be tied to either electrical ground or high while voltage AC2 continues to alternate between high and ground.

Figure 3B:
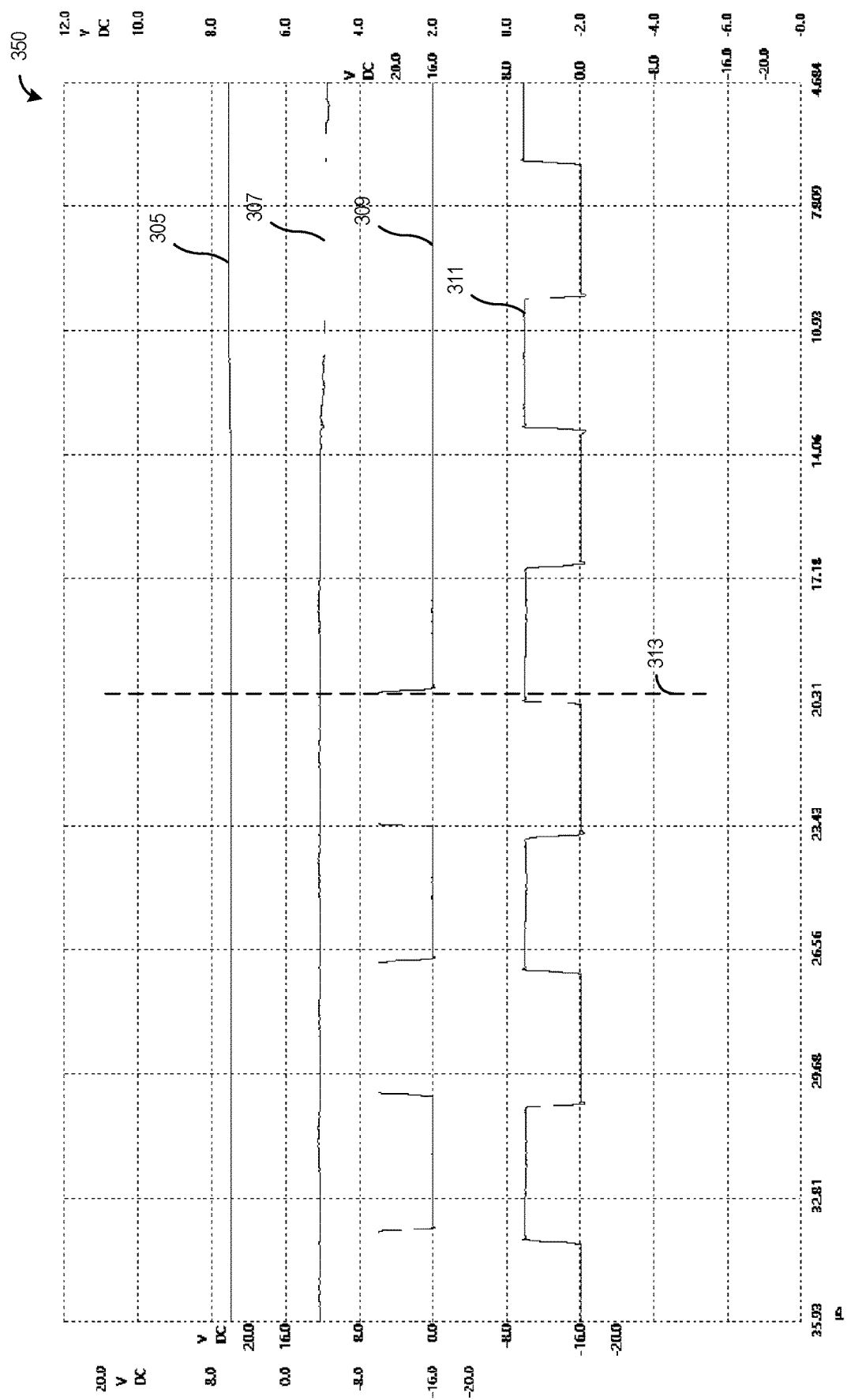
FIG. 3B illustrates a diagram of zoomed in view of voltages in the wireless charging system as the inverter switches from full bridge inverter mode to half bridge inverter mode during an interval indicated in FIG. 3A in accordance with example embodiments presented herein.

FIG. 3B illustrates a diagram 350 of voltages in wireless charging system 100 as inverter 205 switches from full bridge inverter mode to half bridge inverter mode during interval 317. As shown in FIG. 3B, after inverter 205 switches from full bridge inverter mode to half bride inverter mode (at time 313) the voltage of rectifier 215 (trace 307) begins to drop. Although the drop appears to be gradual, the drop occurs in less than 100 micro-seconds, which is much faster than typical Qi standard operation and can lead to unexpected problems.

Figure 4A:
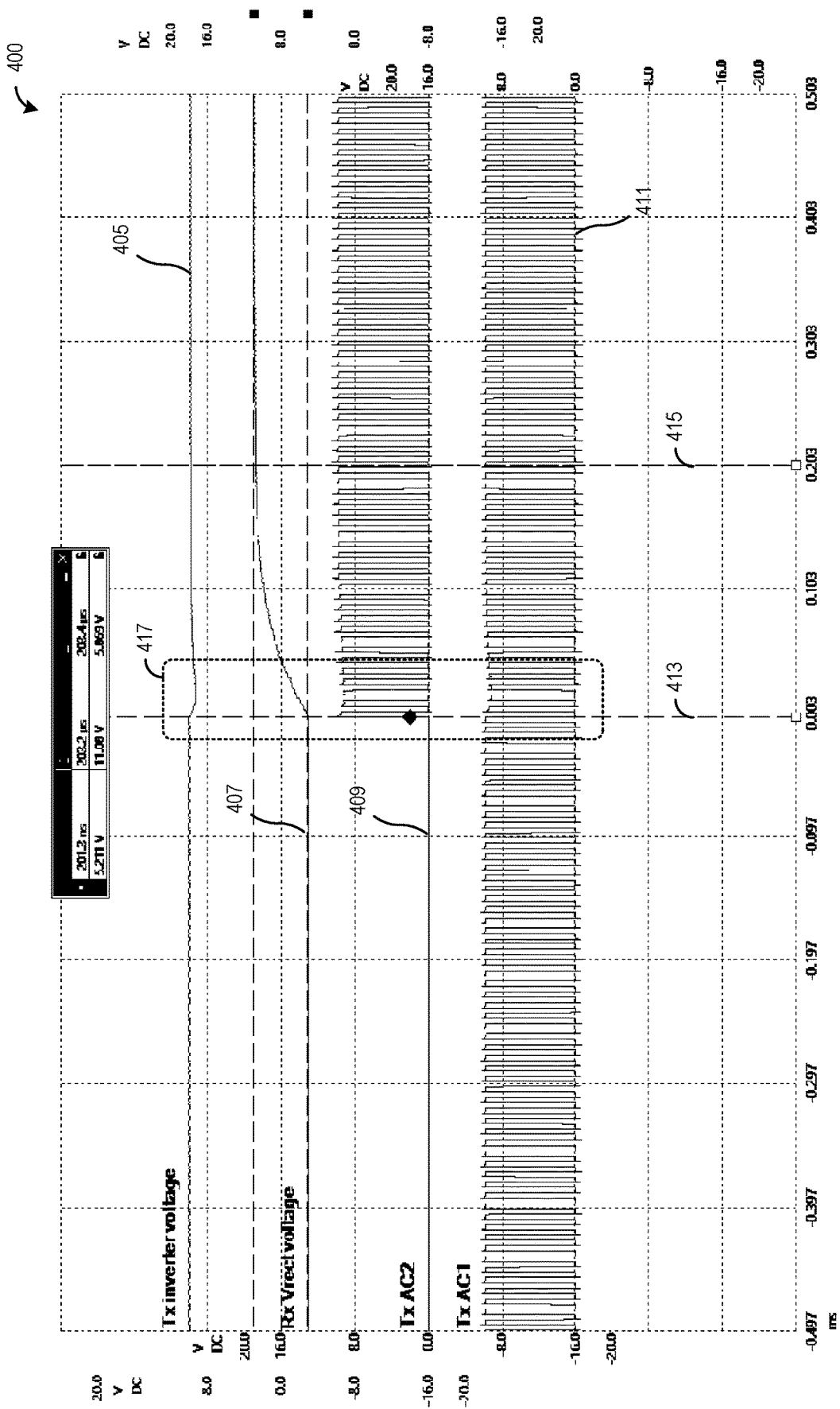
FIG. 4A illustrates a diagram of voltages in the wireless charging system as the inverter switches from half bridge inverter mode to full bridge inverter mode in accordance with example embodiments presented herein.

FIG. 4A illustrates a diagram 400 of voltages in wireless charging system 100 as inverter 205 switches from half bridge inverter mode to full bridge inverter mode. A first trace 405 represents the voltage of inverter 205 of wireless charging TX 105, a second trace 407 represents the voltage VRECT of rectifier 215 of wireless charging RX 110, a third trace 409 represents voltage AC2 of inverter 205, and a fourth trace 411 represents voltage AC1 of inverter 205.

At time 413, inverter 205 switches from half bridge inverter mode to full bridge operating mode. In half bridge inverter mode, only voltage AC1 is alternating between high and ground. After the switch, voltage AC2 is also alternating between high and ground, and the voltage of rectifier 215 rises quickly from approximately 5.21 volts to approximately 11.1 volts within about 200 milli-seconds, which is much faster than typical Qi standard operation. The high voltage of rectifier 215 may cause damage to the device or battery being charged. Interval 417 encompasses the switch in inverter mode. In a different configuration of inverter 205, voltage AC2 may be tied high. In a different configuration of inverter 205, voltage AC1 may be tied to either electrical ground or high while voltage AC2 continues to alternate between high and ground.

Figure 4B:
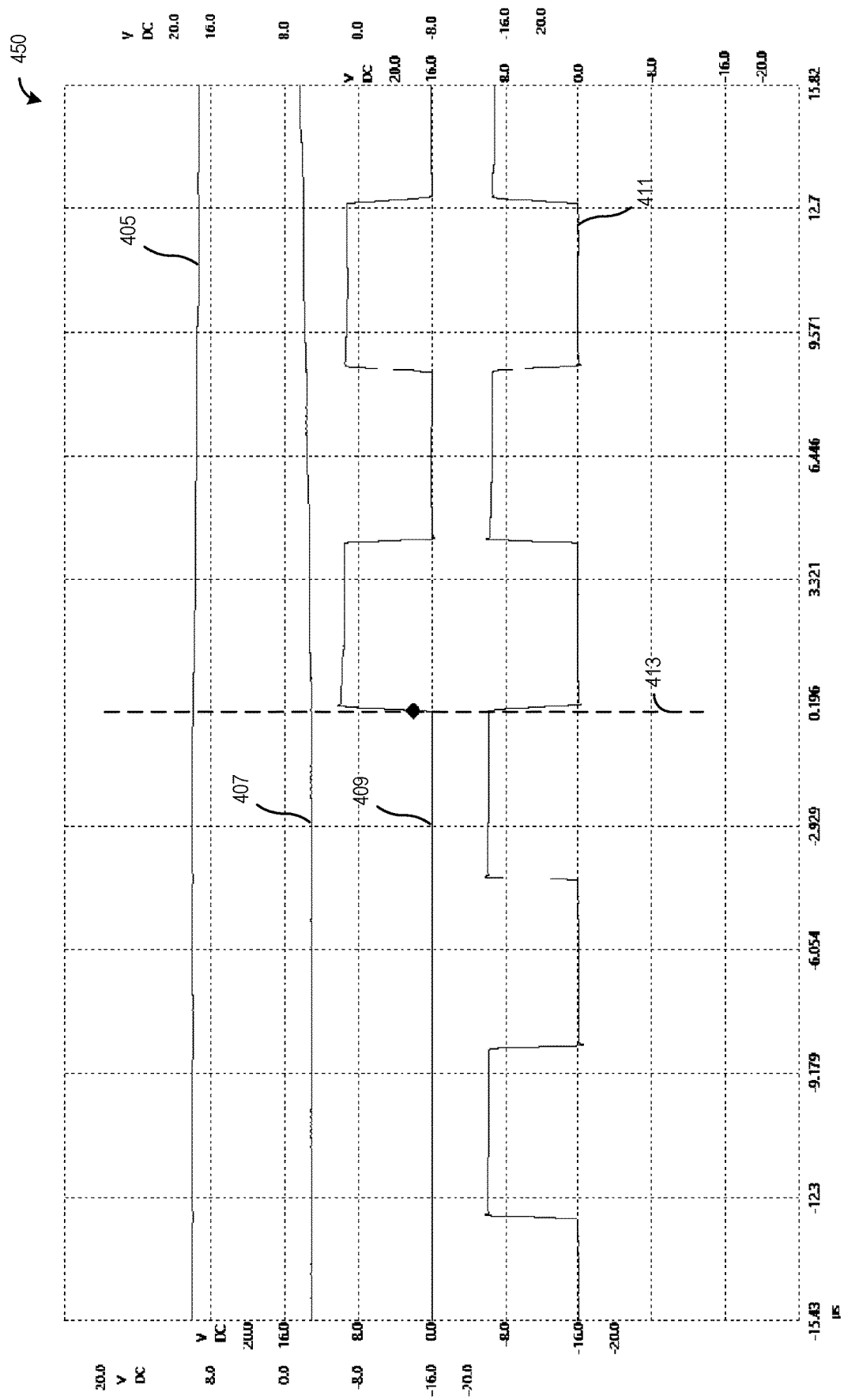
FIG. 4B illustrates a diagram of zoomed in view of voltages in the wireless charging system as the inverter switches from half bridge inverter mode to full bridge inverter mode an interval indicated in FIG. 4A in accordance with example embodiments presented herein.

FIG. 4B illustrates a diagram 450 of voltages in wireless charging system 100 as inverter 205 switches from half bridge inverter mode to full bridge inverter mode during interval 417. As shown in FIG. 4B, after inverter 205 switches from half bridge inverter mode to full bride inverter mode (at time 413) the voltage of rectifier 215 (trace 407) begins to rise. Although the rise appears to be gradual, the rise occurs in less than 200 milli-seconds, which is much faster than typical Qi standard operation and can lead to unexpected problems.

According to an example embodiment, before, during, or after a switch of the inverter mode, the operating point of the wireless charging TX is changed to prevent a rapid drop or increase in the voltage of the rectifier of the wireless charging RX. Changing the operating point of the wireless charging TX may include changing one or more of the AC frequency, the AC duty cycle or phase shift, or the output power of the power supply. As long as the operating point change occurs within a specified interval of the switch of the inverter mode, the voltage of the rectifier of the wireless charging RX does not change significantly. As an example, the operating point change occurs in the order of +/−100 micro-seconds with respect to the switch of the inverter mode.

In an embodiment, the changing of the operating point of the wireless charging TX occurs prior to the switch in the operating mode of the inverter. In an embodiment, the changing of the operating point of the wireless charging TX occurs during the switch in the operating mode of the inverter. In an embodiment, the changing of the operating point of the wireless charging TX occurs after the switch in the operating mode of the inverter. In any of the embodiments, the operating point change occurs in the order of +/−100 micro-seconds with respect to the switch of the inverter mode.

In an embodiment, in the situation where the inverter switches from half bridge inverter mode to full bridge inverter mode, the operating point of the wireless charging TX is changed to reduce the transmitted power of the wireless charging transmitter. Reducing the transmitted power of the wireless charging transmitter prevents a large and rapid rise in the rectifier voltage of the wireless charging receiver, which may lead to damage in the device or battery coupled to the wireless charging receiver. In other words, the change in the operating point of the wireless charging TX dampens the rise in the rectifier voltage of the wireless charging receiver due to the inverter mode switch. The dampening of the rectifier voltage is performed at a level sufficient to prevent the rectifier voltage from increasing to a level that is damaging to a device or battery coupled to the wireless charging receiver, for example. As an example, changes to the operating point include: the AC frequency is increased, the AC duty cycle or AC phase shift is reduced, the input voltage of the wireless charging TX is decreased, or a combination thereof.

In an embodiment, in the situation where the inverter switches from full bridge inverter mode to half bridge inverter mode, the operating point of the wireless charging TX is changed to increase the transmitted power of the wireless charging transmitter. Increasing the transmitted power of the wireless charging transmitter prevents a large and rapid drop in the rectifier voltage of the wireless charging receiver, which may lead to an unintended reset of the wireless charging receiver. In other words, the change in the operating point of the wireless charging TX dampens the drop in the rectifier voltage of the wireless charging receiver due to the inverter mode switch. The dampening of the rectifier voltage is performed to a level sufficient to prevent the rectifier voltage from decreasing to a level that leads to a resetting of the wireless charging receiver, for example. As an example, changes to the operating point include: the AC frequency is decreased, the AC duty cycle or AC phase shift is increased, the input voltage of the wireless charging TX is increased, or a combination thereof.

An advantage of an embodiment is that a wireless charging transmitter (TX) is able to safely switch from half bridge mode to full bridge mode without causing sudden increase in rectifier voltage at the wireless charging receiver (RX), which is both undesirable and potentially damaging. Similarly, the wireless charging TX is able to safely switch from full bridge mode to half bridge mode without causing a sudden decrease in rectifier voltage at the wireless charging RX, which is undesirable and may cause a low voltage reset of the wireless charging RX.

Figure 5A:
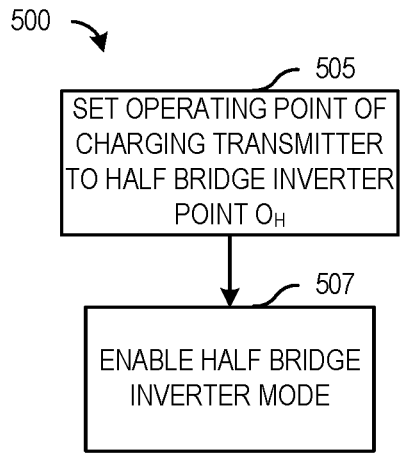
FIG. 5A illustrates a flow diagram of example operations occurring in the wireless charging TX as the operating mode of the inverter is switched from full bridge inverter mode to half bridge inverter mode in accordance with example embodiments presented herein.

FIG. 5A illustrates a flow diagram of example operations 500 occurring in wireless charging TX 105 as the operating mode of inverter 205 is switched from full bridge inverter mode to half bridge inverter mode. Wireless charging TX 105 sets its operating point to half bridge inverter mode operating point $O_H$ (block 505). Setting the operating point of wireless charging TX 105 may include setting one or more of the AC frequency, the AC duty cycle or phase shift, or the output voltage of the power supply. A detailed discussion of determining the half bridge inverter mode operating point $O_H$ is provided below. Wireless charging TX 105 enables the half bridge inverter mode (block 507). Enabling the half bridge inverter mode results in inverter 205 switching from full bridge inverter mode to half bridge inverter mode.

Figure 5B:
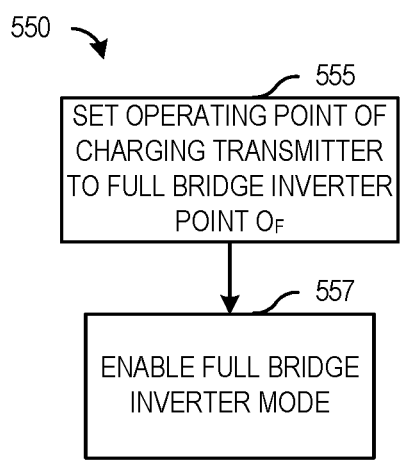
FIG. 5B illustrates a flow diagram of example operations occurring in the wireless charging TX as the operating mode of the inverter is switched from half bridge inverter mode to full bridge inverter mode in accordance with example embodiments presented herein.

FIG. 5B illustrates a flow diagram of example operations 550 occurring in wireless charging TX 105 as the operating mode of inverter 205 is switched from half bridge inverter mode to full bridge inverter mode. Wireless charging TX 105 sets its operating point to full bridge inverter mode operating point $O_F$ (block 555). Setting the operating point of wireless charging TX 105 may include setting one or more of the AC frequency, the AC duty cycle or phase shift, or the output voltage of the power supply. A detailed discussion of determining the full bridge inverter mode operating point $O_F$ is provided below. Wireless charging TX 105 enables the full bridge inverter mode (block 557). Enabling the full bridge inverter mode results in inverter 205 switching from half bridge inverter mode to full bridge inverter mode.

According to an example embodiment, the half bridge inverter mode operating point $O_H$ and the full bridge inverter mode operating point $O_F$ are determined a priori and stored for subsequent use. The operating points may be determined a priori, such as during a setup phase (when wireless charging RX 110 is coupled to wireless charging TX 105, for example), and stored in wireless charging TX 105, for example.

Figure 6:
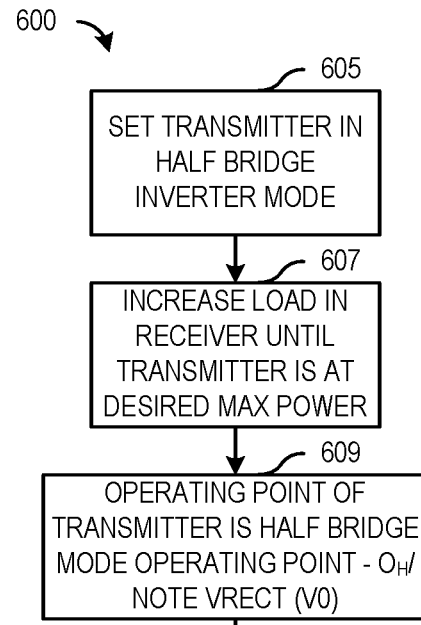
FIG. 6 illustrates a flow diagram of example operations occurring in determining the half bridge inverter mode operating point $O_F$ and the full bridge inverter mode operating point OH in accordance with example embodiments presented herein.
Figure 6:
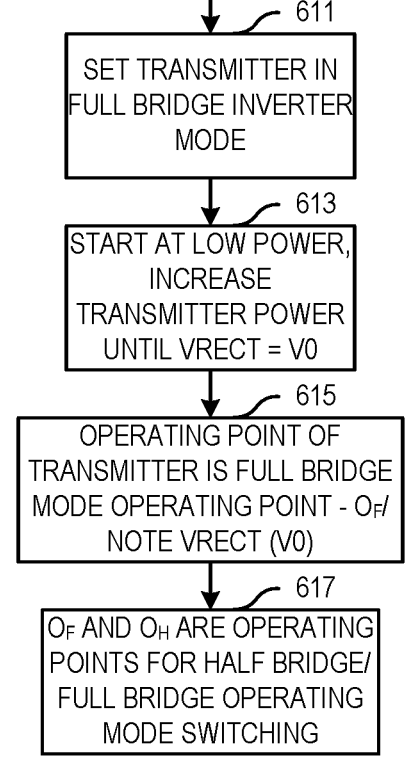

FIG. 6 illustrates a flow diagram of example operations 600 occurring in determining the half bridge inverter mode operating point $O_H$ and the full bridge inverter mode operating point $O_F$. Inverter 205 of wireless charging TX 105 is set to half bridge inverter mode (block 605). Wireless charging TX 105 is paired with wireless charging RX 110. The load of wireless charging RX 110 is increased until wireless charging TX 105 is at a desired maximum power in half bridge inverter mode (block 607). In order to achieve maximum power, the operating point $O_H$ is generally the lowest AC frequency with the maximum duty cycle. Once the power transfer stabilizes, the operating point $O_H$ is determined and stored (block 609). Additionally, the rectifier voltage VRECT Vo is stored.

Inverter 205 of wireless charging TX 105 is set to full bridge inverter mode (block 611). Wireless charging TX 105 is paired with wireless charging RX 110. Start with a low power operating mode (e.g., low AC frequency, high duty cycle, or high phase shift). The power of wireless charging TX 105 is increased (block 613). The power of wireless charging TX 105 is increased until the rectifier voltage VRECT is approximately equal to Vo, for example. Once the power transfer stabilizes, the operating point $O_F$ is determined and stored (block 615). The operating points $O_H$ and $O_F$ are operating points for half bridge inverter mode to full bridge inverter mode switching, and vice versa (block 617).

Figure 7A:
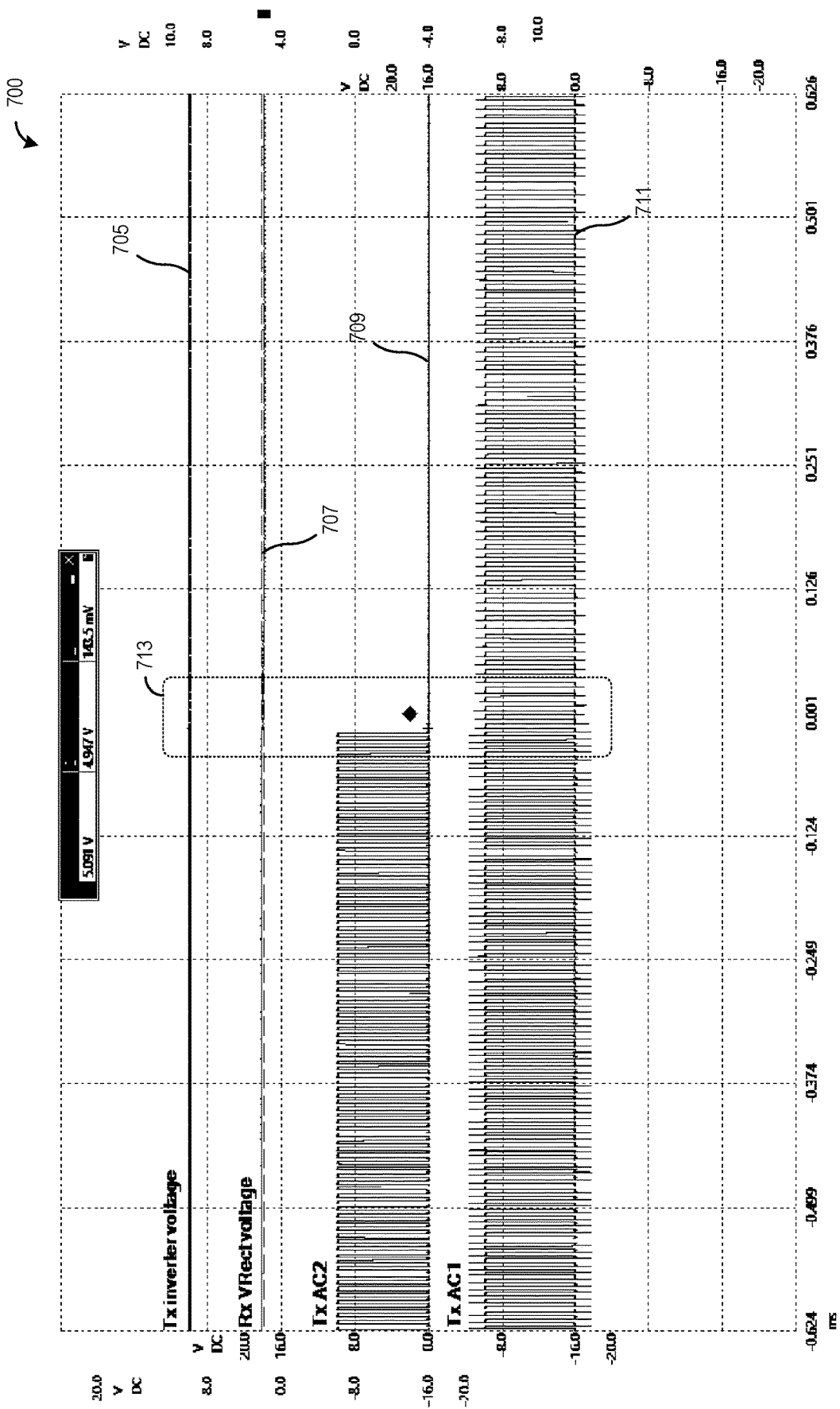
FIG. 7A illustrates a diagram of voltages in the wireless charging system as the inverter switches from full bridge inverter mode to half bridge inverter mode, with the operating point changed to reduce rectifier voltage VRECT swings in accordance with example embodiments presented herein.

FIG. 7A illustrates a diagram 700 of voltages in wireless charging system 100 as inverter 205 switches from full bridge inverter mode to half bridge inverter mode, with the operating point changed to reduce rectifier voltage VRECT swings. A first trace 705 represents the voltage of inverter 205 of wireless charging TX 105, a second trace 707 represents the voltage VRECT of rectifier 215 of wireless charging RX 110, a third trace 709 represents voltage AC2 of inverter 205, and a fourth trace 711 represents voltage AC1 of inverter 205.

Inverter 205 switches from full bridge inverter mode to half bridge operating mode. In full bridge inverter mode, both voltage AC2 and voltage AC1 are alternating within a 5 volt range. After the switch, voltage AC2 is tied to electrical ground and no longer alternates. However, instead of the voltage of rectifier 215 dropping rapidly, the voltage of rectifier 215 remains substantially stable (changing from about 5.09 volts to 4.95 volts). The changed operating point dampened the drop in the voltage of rectifier 215, stabilizing the voltage of rectifier 215. The stable voltage prevents a low voltage reset of wireless charging RX 110. Interval 713 encompasses the switch in inverter mode.

Figure 7B:
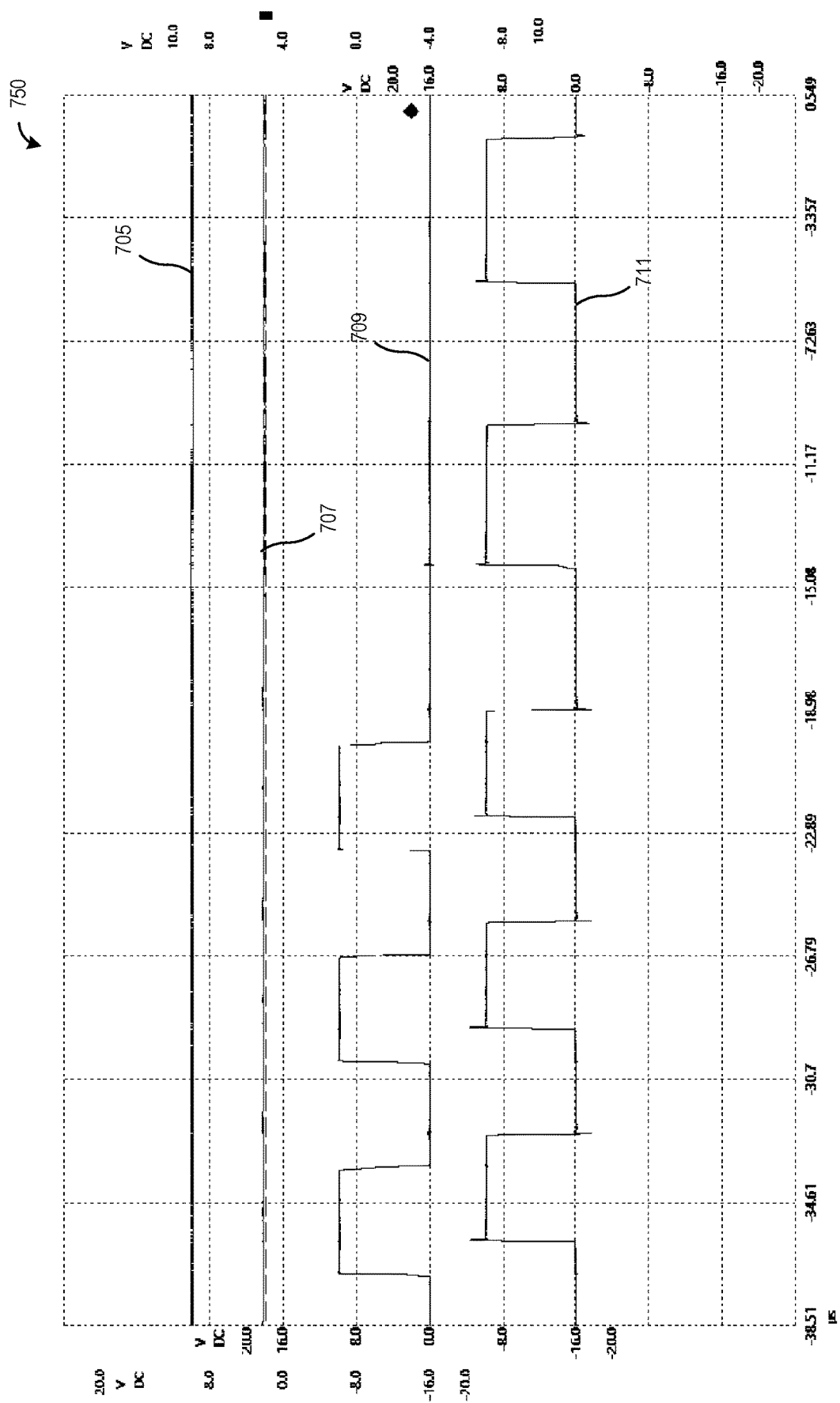
FIG. 7B illustrates a diagram of zoomed in view of voltages in the wireless charging system as the inverter switches from full bridge inverter mode to half bridge inverter mode, with the operating point changed to reduce rectifier voltage VRECT swings in accordance with example embodiments presented herein.

FIG. 7B illustrates a diagram 750 of zoomed in view of voltages in wireless charging system 100 as inverter 205 switches from full bridge inverter mode to half bridge inverter mode, with the operating point changed to reduce rectifier voltage VRECT swings. As shown in FIG. 7B, the operating point (e.g., the AC frequency of voltage AC1 of inverter 205) is changed to help reduce the rectifier voltage VRECT swing. Although the change in the operating point presented herein focused on changing the AC frequency, it is possible to change other components of the operating point, including AC duty cycle and output voltage of the power supply.

Figure 8A:
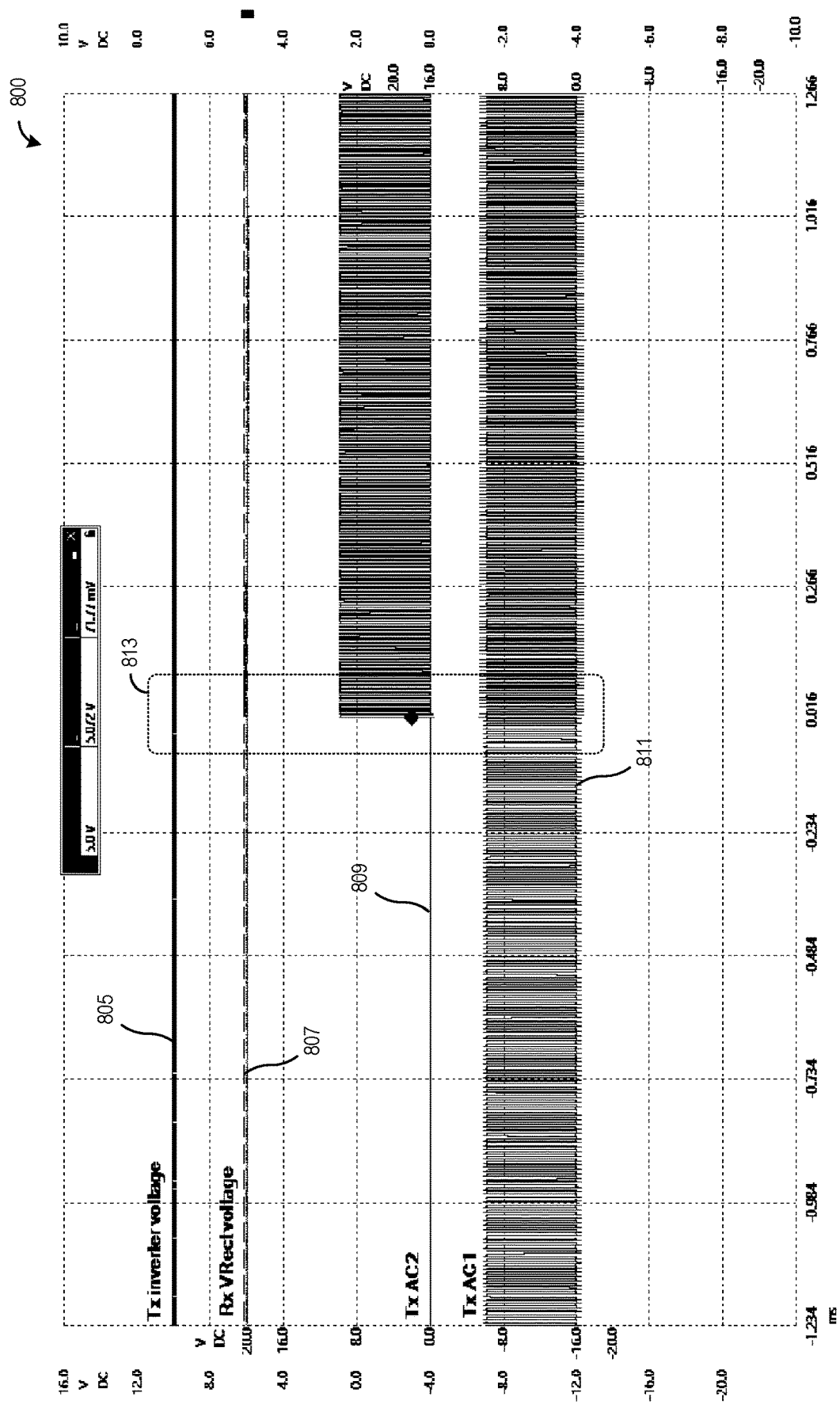
FIG. 8A illustrates a diagram of voltages in the wireless charging system as the inverter switches from half bridge inverter mode to full bridge inverter mode, with the operating point changed to reduce rectifier voltage VRECT swings in accordance with example embodiments presented herein.

FIG. 8A illustrates a diagram 800 of voltages in wireless charging system 100 as inverter 205 switches from half bridge inverter mode to full bridge inverter mode, with the operating point changed to reduce rectifier voltage VRECT swings. A first trace 805 represents the voltage of inverter 205 of wireless charging TX 105, a second trace 807 represents the voltage VRECT of rectifier 215 of wireless charging RX 110, a third trace 809 represents voltage AC2 of inverter 205, and a fourth trace 811 represents voltage AC1 of inverter 205.

Inverter 205 switches from half bridge inverter mode to full bridge operating mode. In half bridge inverter mode, voltage AC2 is alternating within a 5 volt range and voltage AC1 is pulled to electrical ground. After the switch, both voltage AC2 and voltage AC1 are alternating with a 5 volt range. However, instead of the voltage of rectifier 215 increasing rapidly, the voltage of rectifier 215 remains substantially stable (changing from about 5.00 volts to 5.07 volts). The changed operating point dampened the rise in the voltage of rectifier 215, stabilizing the voltage of rectifier 215. The stable voltage prevents potential damage to the device or battery of the device coupled to wireless charging RX 110. Interval 813 encompasses the switch in inverter mode.

Figure 8B:
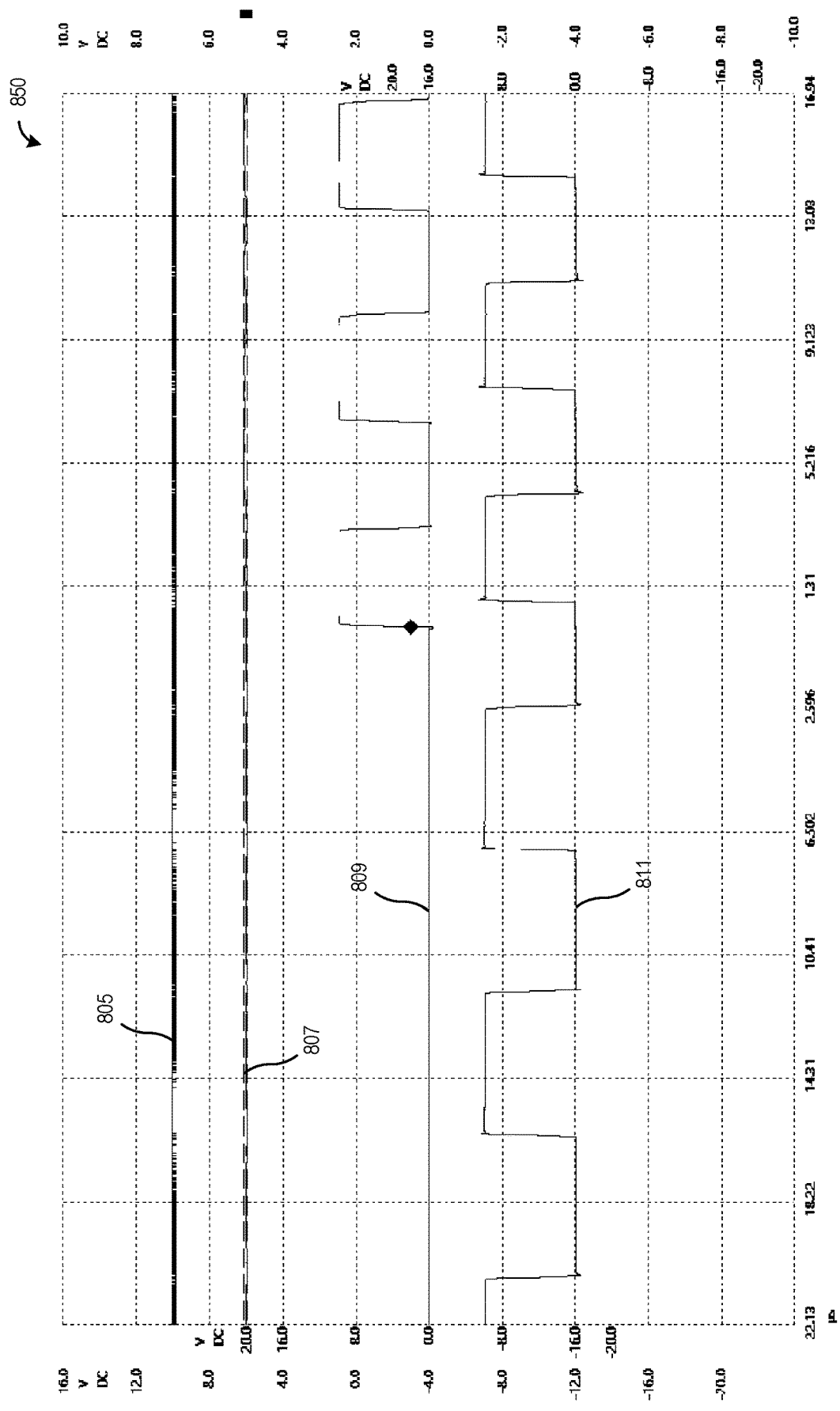
FIG. 8B illustrates a diagram of zoomed in view of voltages in the wireless charging system as the inverter switches from half bridge inverter mode to full bridge inverter mode, with the operating point changed to reduce rectifier voltage VRECT swings in accordance with example embodiments presented herein.

FIG. 8B illustrates a diagram 750 of zoomed in view of voltages in wireless charging system 100 as inverter 205 switches from half bridge inverter mode to full bridge inverter mode, with the operating point changed to reduce rectifier voltage VRECT swings. As shown in FIG. 8B, the operating point (e.g., the AC frequency of voltage AC1 and AC2 of inverter 205, as well as the phase shift) is changed to help reduce the rectifier voltage VRECT swing. Although the change in the operating point presented herein focused on changing the AC frequency and the phase shift, it is possible to change other components of the operating point, such as AC duty cycle and output voltage of the power supply.

Figure 9:
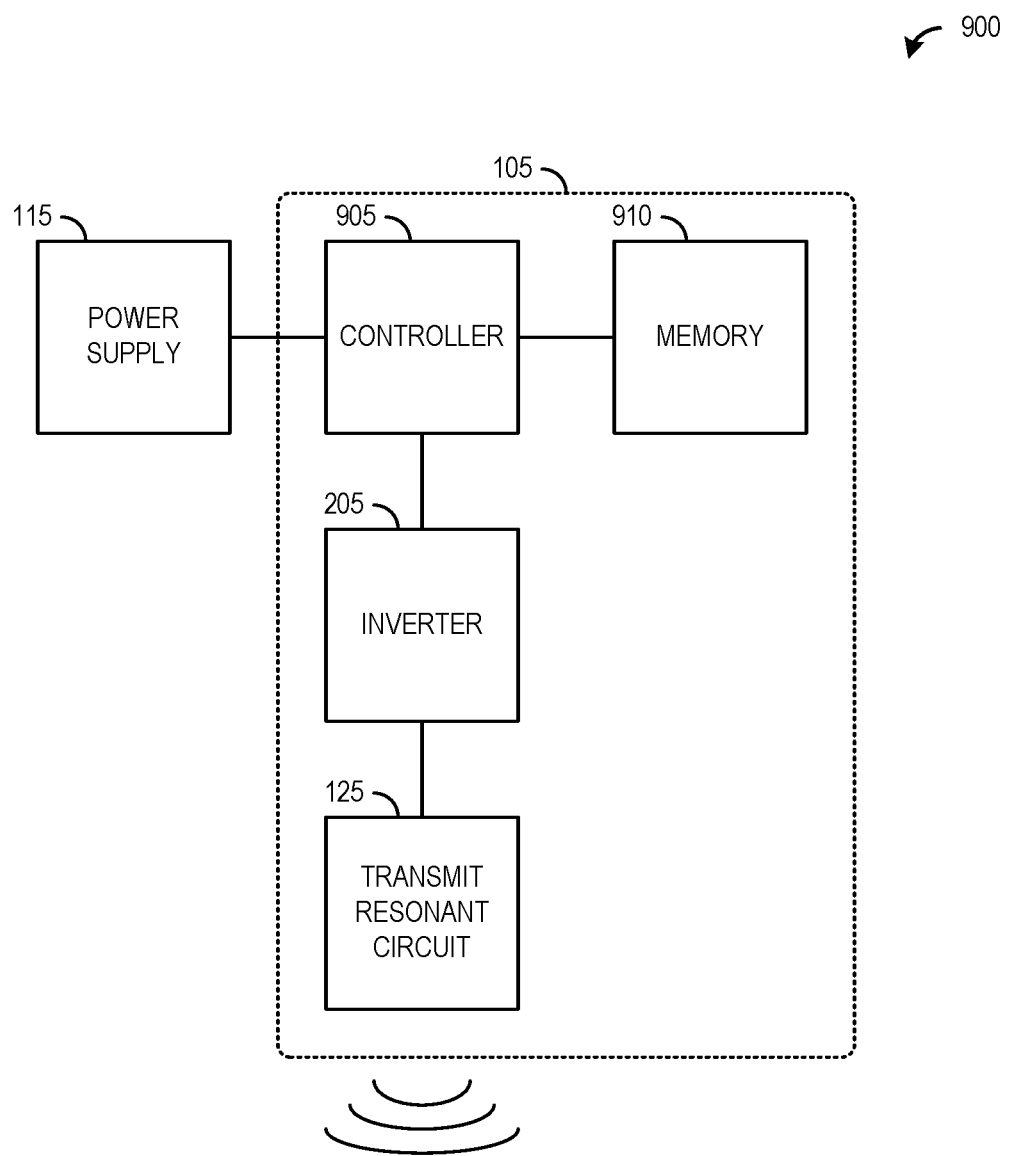
FIG. 9 illustrates a diagram of wireless charging TX in accordance with example embodiments presented herein.

FIG. 9 illustrates a diagram 900 of wireless charging TX 105. Wireless charging TX 105 may utilize the example embodiments presented herein to provide safe inverter mode switching. Wireless charging TX 105 may be attached to or a part of a wireless charging system, which may also include wireless charging RX 110.

Wireless charging TX 105 is coupled to power supply 115 that is configured to provide an output voltage. The output voltage powers wireless charging TX 105, as well as provides the DC power that is converted to AC power that is transmitted wirelessly over the air to wireless charging RX 110.

Wireless charging TX 105 includes a controller 905, a memory 910, inverter 205, and transmit resonant circuit 125. Controller 905 is configured to control the operation of wireless charging TX 105, including setting the mode of inverter 205, the operating point of wireless charging TX 105, determining the operating points of wireless charging TX 105 to enable the safe inverter mode switching (which helps to dampen the change in the rectifier voltage of wireless charging RX 110 wirelessly coupled to wireless charging TX 105), responding to communication from wireless charging RX 110 and respond accordingly, and so on. Memory 910 provides storage for information and data, such as the operating points of wireless charging TX 105, communication from wireless charging RX 110, software or firmware for determining the operating points of wireless charging TX 105, and so on. Although shown in FIG. 9 with direct connections between the various components of wireless charging TX 105, some or all of the components of wireless charging TX 105 may be connected through a communication bus.

Example embodiments of the invention are summarized here. Other embodiments can also be understood from the entirety of the specification as well as the claims filed herein.

Example 1. A method for operating a wireless charging transmitter, the method including: switching, by the wireless charging transmitter, an operating mode of a full bridge inverter of the wireless charging transmitter from a first mode to a second mode; and changing, by the wireless charging transmitter, an operating point of the wireless charging transmitter from a first operating point associated with the first mode to a second operating point associated with the second mode, the second operating point being selected to dampen a change in a rectifier voltage of a wireless charging receiver inductively coupled to the wireless charging transmitter.

Example 2. The method of example 1, the operating point including at least one of an alternating current (AC) frequency of the full bridge inverter, an AC duty cycle of the full bridge inverter, a phase shift of the full bridge inverter, or an output voltage level of a power supply of the wireless charging transmitter.

Example 3. The method of one of examples 1 or 2, the first mode including a full bridge inverter mode and the second mode including a half bridge inverter mode.

Example 4. The method of one of examples 1 to 3, an AC frequency of the second operating point being lower than an AC frequency of the first operating point.

Example 5. The method of one of examples 1 to 4, an AC duty cycle of the second operating point being higher than an AC duty cycle of the first operating point.

Example 6. The method of one of examples 1 to 5, an output voltage level of the power supply associated with the second operating point being higher than an output voltage level of the power supply associated with the first operating point.

Example 7. The method of one of examples 1 to 6, the first mode including a half bridge inverter mode and the second mode including a full bridge inverter mode.

Example 8. The method of one of examples 1 to 7, an AC frequency of the second operating point being higher than an AC frequency of the first operating point.

Example 9. The method of one of examples 1 to 8, an AC duty cycle of the second operating point being lower than an AC duty cycle of the first operating point.

Example 10. The method of one of examples 1 to 9, an AC phase shift of the second mode being higher than an AC duty cycle operating point the first operating point.

Example 11. The method of one of examples 1 to 10, an output voltage level of the power supply associated with the second operating point being lower than an output voltage level of the power supply associated with the first operating point.

Example 12. The method of one of examples 1 to 11, the changing occurring one of before, after, or substantially simultaneously with, the switching.

Example 13. A method for operating a wireless charging transmitter, the method including: setting, by the wireless charging transmitter, a full bridge inverter of the wireless charging transmitter to a half bridge inverter mode; increasing, by the wireless charging transmitter, a load of a wireless charging receiver paired to the wireless charging transmitter until a power transfer of the wireless charging transmitter meets a specified threshold; and saving, by the wireless charging transmitter, an operating point of the wireless charging transmitter as a first operating point associated with a half bridge inverter mode, and a rectifier voltage of the wireless charging receiver as a target rectifier voltage, the first operating point dampens a first change in a rectifier voltage of the wireless charging receiver.

Example 14. The method of example 13, further including: setting, by the wireless charging transmitter, the full bridge inverter of the wireless charging transmitter to a full bridge inverter mode; increasing, by the wireless charging transmitter, a transmit power of the wireless charging transmitter until the rectifier voltage of the wireless charging receiver meets the target rectifier voltage; and saving, by the wireless charging transmitter, the operating point of the wireless charging transmitter as a second operating point associated with a full bridge inverter mode, the second operating point dampens a second change in the rectifier voltage of the wireless charging receiver.

Example 15. The method of one of examples 13 or 14, increasing the transmit power including at least one of decreasing an alternating current (AC) frequency, decreasing an AC duty cycle, decreasing an AC phase shift, or increasing an output voltage level of a power supply of the wireless charging transmitter.

Example 16. The method of one of examples 13 to 15, further including setting, by the wireless charging transmitter, an initial operating point.

Example 17. The method of one of examples 13 to 16, the initial operating point including at least one of an AC frequency, an AC duty cycle, an AC phase shift, or an output voltage level of a power supply of the wireless charging transmitter.

Example 18. A wireless charging transmitter including: a non-transitory memory storage including instructions; and one or more processors in communication with the memory storage, where the one or more processors execute the instructions to cause the wireless charging transmitter to: switch an operating mode of a full bridge inverter of the wireless charging transmitter from a first mode to a second mode; and change an operating point of the wireless charging transmitter from a first operating point associated with the first mode to a second operating point associated with the second mode, the second operating point being selected to dampen a change in a rectifier voltage of a wireless charging receiver inductively coupled to the wireless charging transmitter.

Example 19. The wireless charging transmitter of example 18, the instructions further causing the wireless charging transmitter to reduce a transmitted power of the wireless charging transmitter when the first mode is a half bridge inverter mode and the second mode is a full bridge inverter mode.

Example 20. The wireless charging transmitter of one of examples 18 or 19, the instructions further causing the wireless charging transmitter to increase a transmitted power of the wireless charging transmitter when the first mode is a full bridge inverter mode and the second mode is a half bridge inverter mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a wireless charging transmitter, the method comprising:

switching, by the wireless charging transmitter, an operating mode of a full bridge inverter of the wireless charging transmitter between a higher maximum transmitted power mode and a lower maximum transmitted power mode, wherein transmitted power of the wireless charging transmitter is controlled using an operating point comprising at least one of an alternating current (AC) frequency of the full bridge inverter, an AC duty cycle of the full bridge inverter, an AC phase shift of the full bridge inverter, or an input voltage of the wireless charging transmitter; and changing, by the wireless charging transmitter, the operating point of the wireless charging transmitter between a higher induced voltage operating point and a lower induced voltage operating point to dampen a change in an induced rectifier voltage of a wireless charging receiver inductively coupled to the wireless charging transmitter while switching the operating mode between the higher maximum transmitted power mode and the lower maximum transmitted power mode by reducing the AC frequency or increasing the AC duty cycle, the AC phase shift, or the input voltage to change the operating point to the higher induced voltage operating point while switching the operating mode from the higher maximum transmitted power mode to the lower maximum transmitted power mode and increasing the AC frequency or reducing the AC duty cycle, the AC phase shift, or the input voltage to change the operating point to the lower induced voltage operating point while switching the operating mode from the lower maximum transmitted power mode to the higher maximum transmitted power mode.

2. The method of claim 1, the operating point comprising all of the AC frequency of the full bridge inverter, the AC duty cycle of the full bridge inverter, the AC phase shift of the full bridge inverter, and the input voltage of the wireless charging transmitter.

3. The method of claim 1, the higher maximum transmitted power mode being a full bridge inverter mode and the lower maximum transmitted power mode being a half bridge inverter mode.

4. The method of claim 3, wherein changing the operating point comprises reducing the AC frequency while switching the operating mode from the higher maximum transmitted power mode to the lower maximum transmitted power mode.

5. The method of claim 3, wherein changing the operating point comprises increasing the AC duty cycle while switching the operating mode from the higher maximum transmitted power mode to the lower maximum transmitted power mode.

6. The method of claim 3, wherein changing the operating point comprises increasing the input voltage while switching the operating mode from the higher maximum transmitted power mode to the lower maximum transmitted power mode.

7. The method of claim 1, the changing occurring within about 100 microseconds of the switching.

8. The method of claim 7, the changing occurring before the switching.

9. The method of claim 1, wherein changing the operating point to the higher induced voltage operating point comprises reducing the AC frequency or increasing the AC duty cycle, the AC phase shift, or the input voltage sufficiently to prevent the induced rectifier voltage from decreasing to a level that leads to a resetting of the wireless charging receiver.

10. The method of claim 1, wherein changing the operating point to the lower induced voltage operating point comprises increasing the AC frequency or reducing the AC duty cycle, the AC phase shift, or the input voltage sufficiently to prevent the induced rectifier voltage from increasing to a level that is damaging to a device or battery coupled to the wireless charging receiver.

11. A method for operating a wireless charging transmitter, the method comprising:

setting, by the wireless charging transmitter, a full bridge inverter of the wireless charging transmitter to a half bridge inverter mode, wherein transmitted power of the wireless charging transmitter is controlled using an operating point comprising at least one of an alternating current (AC) frequency of the full bridge inverter, an AC duty cycle of the full bridge inverter, an AC phase shift of the full bridge inverter, or an input voltage of the wireless charging transmitter;

increasing, by the wireless charging transmitter, a load of a wireless charging receiver paired to the wireless charging transmitter until a power transfer of the wireless charging transmitter meets a specified threshold; and saving, by the wireless charging transmitter, the operating point of the wireless charging transmitter as a higher induced voltage operating point associated with the half bridge inverter mode, and an induced rectifier voltage of the wireless charging receiver as a target rectifier voltage, the higher induced voltage operating point being selected to dampen a change in the induced rectifier voltage of the wireless charging receiver while switching the full bridge inverter to the half bridge inverter mode; and dampening the change in the induced rectifier voltage of the wireless charging receiver while switching the full bridge inverter from a full bridge inverter mode to the half bridge inverter mode by setting the operating point of the wireless charging transmitter to the higher induced voltage operating point.

12. The method of claim 11, further comprising:

setting, by the wireless charging transmitter, the full bridge inverter of the wireless charging transmitter to the full bridge inverter mode;

reducing, by the wireless charging transmitter, the transmit power of the wireless charging transmitter until the induced rectifier voltage of the wireless charging receiver meets the target rectifier voltage; and saving, by the wireless charging transmitter, the operating point of the wireless charging transmitter as a lower induced voltage operating point associated with the full bridge inverter mode, the lower induced voltage operating point being selected to dampen a-change in the induced rectifier voltage of the wireless charging receiver when switching the full bridge inverter to the full bridge inverter mode; and dampening the change in the induced rectifier voltage of the wireless charging receiver while switching the full bridge inverter from the half bridge inverter mode to the full bridge inverter mode by setting the operating point of the wireless charging transmitter to the lower induced voltage operating point.

13. The method of claim 12, wherein setting the operating point to the higher induced voltage operating point comprises reducing the AC frequency or increasing the AC duty cycle, AC phase shift, or the input voltage.

14. The method of claim 11, further comprising setting, by the wireless charging transmitter, the operating point to an initial operating point.

15. The method of claim 11, wherein setting the operating point occurs within about 100 microseconds of switching the full bridge inverter from the full bridge inverter mode to the half bridge inverter mode.

16. The method of claim 15, wherein setting the operating point occurs before switching the full bridge inverter from the full bridge inverter mode to the half bridge inverter mode.

17. A wireless charging transmitter comprising:

a non-transitory memory storage comprising instructions; and one or more processors in communication with the non-transitory memory storage, wherein the one or more processors execute the instructions to cause the wireless charging transmitter to:

switch an operating mode of a full bridge inverter of the wireless charging transmitter between higher maximum transmitted power mode and a lower maximum transmitted power mode, wherein transmitted power of the wireless charging transmitter is controlled using an operating point comprising at least one of an alternating current (AC) frequency of the full bridge inverter, an AC duty cycle of the full bridge inverter, an AC phase shift of the full bridge inverter, or an input voltage of the wireless charging transmitter; and change the operating point of the wireless charging transmitter between a higher induced voltage operating point and a lower induced voltage operating point to dampen a change in an induced rectifier voltage of a wireless charging receiver inductively coupled to the wireless charging transmitter while switching the operating mode between the higher maximum transmitted power mode and the lower maximum transmitted power mode by reducing the AC frequency or increasing the AC duty cycle, the AC phase shift, or the input voltage to change the operating point to the higher induced voltage operating point while switching the operating mode from the higher maximum transmitted power mode to the lower maximum transmitted power mode and increasing the AC frequency or reducing the AC duty cycle, the AC phase shift, or the input voltage to change the operating point to the lower induced voltage operating point while switching the operating mode from the lower maximum transmitted power mode to the higher maximum transmitted power mode.

18. The wireless charging transmitter of claim 17, the higher maximum transmitted power mode being a full bridge inverter mode and the lower maximum transmitted power mode being a half bridge inverter mode.

19. The wireless charging transmitter of claim 17, wherein the instructions further cause the wireless charging transmitter to change the operating point to the higher induced voltage operating point by reducing the AC frequency or increasing the AC duty cycle, the AC phase shift, or the input voltage sufficiently to prevent the induced rectifier voltage from decreasing to a level that leads to a resetting of the wireless charging receiver.

20. The wireless charging transmitter of claim 17, wherein the instructions further cause the wireless charging transmitter to change the operating point to the lower induced voltage operating point by increasing the AC frequency or reducing the AC duty cycle, the AC phase shift, or the input voltage sufficiently to prevent the induced rectifier voltage from increasing to a level that is damaging to a device or battery coupled to the wireless charging receiver.

* * * * *